(12) United States Patent
Johnson et al.

(10) Patent No.: US 8,017,236 B2
(45) Date of Patent: Sep. 13, 2011

(54) CARBON COATED HIGH LUSTER MATERIALS

(75) Inventors: Geoffrey M. Johnson, Wappingers Falls, NY (US); Steven A. Jones, Budd Lake, NJ (US); Ahmad Moini, Princeton, NJ (US); Gerald S. Koermer, Basking Ridge, NJ (US); William M. Jaglowski, West Orange, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 11/410,548

(22) Filed: Apr. 25, 2006

(65) Prior Publication Data

US 2006/0292371 A1    Dec. 28, 2006

Related U.S. Application Data

(62) Division of application No. 10/840,299, filed on May 7, 2004.

(60) Provisional application No. 60/471,636, filed on May 19, 2003.

(51) Int. Cl.
  *B32B 5/66*    (2006.01)
(52) U.S. Cl. .......................... 428/403; 428/404; 428/407

(58) Field of Classification Search .................. 428/402, 428/403, 404, 407
See application file for complete search history.

(56) References Cited

U.S. PATENT DOCUMENTS

| | | | |
|---|---|---|---|
| 3,087,828 A | 4/1963 | Linton | |
| 3,107,173 A | 10/1963 | Klenke, Jr. | |
| 3,418,146 A | 12/1968 | Rieger et al. | |
| 3,437,513 A | 4/1969 | Burlant et al. | |
| 4,083,099 A | 4/1978 | Yano et al. | |
| 4,084,983 A | 4/1978 | Bernhard et al. | |
| 4,755,229 A | 7/1988 | Armanini | |
| 4,874,466 A | 10/1989 | Savino | |
| 4,968,351 A | 11/1990 | Ahmed et al. | |
| 5,006,574 A | 4/1991 | Sennett et al. | |
| 5,152,835 A | 10/1992 | Nemeh | |
| 5,271,771 A | 12/1993 | Franz et al. | |
| 5,286,291 A | 2/1994 | Bernhardt et al. | |
| 5,356,471 A | 10/1994 | Reynders | |
| 5,702,518 A | 12/1997 | Vogt et al. | |
| 5,759,255 A * | 6/1998 | Venturini et al. | 106/418 |
| 6,436,538 B1 | 8/2002 | Takahashi et al. | |
| 7,371,456 B2 * | 5/2008 | Nohr et al. | 428/403 |

* cited by examiner

*Primary Examiner* — Leszek Kiliman
(74) *Attorney, Agent, or Firm* — Bernard Lau

(57) ABSTRACT

A platy pigment substrate having a carbon-containing coating thereon is provided wherein the coating comprises a pyrolyzed carbon-containing ionic species. The products of the present invention may be used in any application where pearlescent pigments have been used heretofore including but not limited to automotive and industrial paint applications.

17 Claims, 7 Drawing Sheets

CARBON COATED HIGH LUSTER MATERIALS

CROSS REFERENCE TO RELATED APPLICATIONS

This application is a divisional of co-pending application Ser. No. 10/840,299 filed May 7, 2004 and a Continuation-in-part of Provisional Application Ser. No. 60/471,636 filed May 19, 2003.

BACKGROUND OF THE INVENTION

Effect pigments, also known as nacreous pigments and pearlescent pigments, are lustrous specialty chemical products which are widely used in a variety of high-end applications such as automotive finishes. One of the attributes of the effect pigments is that they can generate a range of optical effects depending on the angle at which they are viewed.

In a number of applications, the effect materials have a lesser degree of hiding power than desired. One method which has been used to address this problem is to incorporate a carbonaceous material within the formulation. Users, however, would prefer that the carbon additive be supplied as a part of the effect material rather than separately to be added by the user prior to application.

Effect pigments are often based on platelet shaped particles. Because the optical effect is the result of multiple reflections and transmission of light, it is desirable to provide particles which will align in the medium in which they are found and to optimize the desired effect. The presence of either misaligned particles or particles of an additive, or both, interferes with this objective and diminishes the optical effect of the pigment. It is therefore desirable for the carbon additive being used for increased hiding to be somehow bound to the platelets rather than present as part of a physical mixture.

The formation of a carbon coating on a platy substrate is known. U.S. Pat. No. 3,107,173 discloses a coating of translucent micaceous flake substrates with a thin, adherent, substantially continuous, translucent layer of carbon. The carbon layer is formed on the flake substrates by pyrolyzing a carbon-containing material in contact with the flake substrate in an inert atmosphere.

U.S. Pat. No. 5,702,518 discloses a gold-colored pigment in which a substrate coated with metal oxides is characterized by a first layer of titanium dioxide doped with carbon obtained by thermal decomposition of organic colloidal particles and a second layer which is ferric oxide.

U.S. Pat. No. 5,356,471 teaches the formation of a platelet-like substrate coated with metal oxides in which a black surface color is achieved by reacting the platelet-like substrate with a silane followed by pyrolysis.

According to U.S. Pat. No. 5,286,291, prior art processes where carbon black was formed by pyrolysis of organic compounds or by mixing a substrate with carbon black followed by hydrolyzing a metal salt, results in producing pigments with insufficient wear resistance or the deposition of the carbon black on the pigment is in agglomerated form so that the pigments do not have good hiding power. To overcome this disadvantage, the patent teaches coating the platelet-like substrates with carbon black particles, and optionally a metal oxide, and being doped with an anionic or cationic and non-ionic surfactants and an organosilane compound so as to fix the carbon black on the substrate and improve the abrasion and bleeding resistance of the pigment. The resulting product is calcined.

U.S. Pat. No. 5,271,771 teaches the formation of carbon-containing plate-like pigments by pyrolysis of carbon containing compounds in the presence of either plate-like metal oxides or metal oxide mixtures or substrates coated with titanium dioxide and at least one further metal oxide under conditions in which the metal of the metal oxide is reduced. The metal oxide or metal oxide mixtures can include $Fe_2O_3$.

U.S. Pat. No. 6,436,538 teaches effect pigments which are a collection of platelet-like particles coated with a nitrogen-doped carbon coating. This is made by adding a carbon and nitrogen containing polymer (or monomers to form the same) to the particles suspended in a liquid, coating the polymer on the surface of the particles, optionally in the presence of a surface modifier such as a neutral, cationic, anionic or amphoteric surfactant, reactive metal compound or polar polymer, and then pyrolyzing the particles in a gaseous atmosphere.

The object of the present invention is to provide a new process for forming carbon-containing, highly lustrous materials and to the resulting materials so produced. This and other objects of the invention will become apparent to those skilled in this art from the following detailed description.

SUMMARY OF THE INVENTION

This invention provides a pigment comprising a platy pigment substrate having a coating thereon wherein the coating comprises a carbon-containing ionic species which is treated to form a uniform or non-uniform layer of carbon on the substrate.

This invention also provides a pigment comprising an effect pigment substrate having a carbon-containing coating thereon wherein the coating comprises a pyrolyzed carbon-containing ionic species.

This invention also provides a pigment comprising an effect pigment substrate having a thin carbon-containing coating on the surface thereof, wherein the carbon in the coating is less than about 5% of the total weight and the carbon-containing coating is such that the hiding power of the carbon-coated pigment is greater than that of the substrate.

The invention also relates to the method of forming a carbon-coated high luster pigment in which an effect pigment (substrate) is coated with alternating layers of carbon-containing cationic and anionic species and the coating is then pyrolyzed or otherwise treated to yield a carbon coating on the substrate.

This invention also provides a method of forming a carbon-coated high luster platy pigment which comprises pyrolyzing a coated pigment comprising a platy pigment substrate having one charged carbon-containing ionic species or alternating layers of oppositely charged carbon-containing ionic species thereon.

DESCRIPTION OF THE INVENTION

Figure 1:
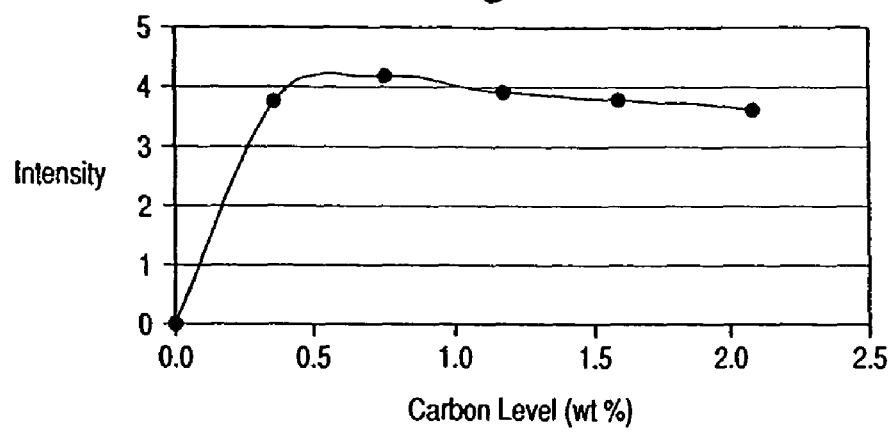
FIG. 1 shows the influence of carbon content on the intensity of a UV-Vis band at approximately 425 nm for a first carbon-coated effect pigment.

The substrates which can be employed in the present invention can be any known platy pigment, preferably an effect pigment, which is optionally coated with a wide variety of inorganic coloring agents.

The substrate to be treated can also be any platy material such as mica flakes, titanium dioxide, sericite, kaolin, gypsum, bismuth oxychloride, glass, platy iron oxide, platy aluminum oxide, platy silicon dioxide, synthetic mica and the like. Suitable mixtures of platy substrates may also be used.

Usable coated platelets are exemplified by titanium dioxide-, zirconium dioxide- and/or iron oxide-coated mica and/or glass. The substrate may also be an optically variable pearlescent or effect pigment.

Preferred are the well-known metal-oxide-coated mica or glass effect pigments. The metal oxide-coated substrate nacreous pigments are well known and are exemplified by titanium dioxide- and/or iron oxide-coated mica. Such pigments are described, inter alia, in U.S. Pat. Nos. 3,437,513; 3,418,146; 3,087,828; and 4,083,099. A preferred nacreous pigment is titanium dioxide-coated mica. The mica flake substrates generally have a length of about 1 to about 75 microns, preferably about 5 to about 35 microns, and a thickness between about 0.3 and about 3 microns, but both larger and smaller dimensions can also be employed. Usually, the titanium dioxide or other metal oxide will be coated on the substrate surface to a thickness of about 20 to about 350 nanometers or such that it is about 50 to 500 mg/m$^2$, depending on the specific surface area of the substrate in m$^2$/g. Depending on the thickness of the metal oxide coating, the pigments can exhibit interference or reflection colors of blue, green, yellow, red, etc.

The substrate, which forms the core of the final product, is then provided with alternating layers of charged carbon-containing ionic species. The carbon-containing cationic and anionic species can be any organic compound containing a carbon group, preferably, a plurality of carbon groups and which has a positive or negative charge under reaction conditions. Also preferred are organic oligomers and polymers having a positve or negative charge under reaction conditions. In most cases the compounds, oligomers or polymers will contain a counter ion. The process used is similar to that taught in U.S. Pat. No. 5,152,835, the disclosure of which is incorporated herein by reference, where a composite titania-calcined kaolin opacifying pigment was prepared by introducing at least one anionic polymer into a pigment slurry to which a cationic polyelectrolyte was introduced using a strongly alkaline pH above 9.

The charge on the core particles is used in the present invention to facilitate the adsorption of an ionic species on the surface of the particles. The ionic species can be either anionic or cationic. In one process, a solution or dispersion of the desired ionic species is first prepared. The pigment particles are then added, with mixing, to the solution or dispersion. Some pigments may require prior wetting, with a wetting agent, before adding the pigment to the solution or dispersion. That is, the core pigment particle dispersion is formed, with either an anionic or cationic ionic species which imparts to the particle a charge of opposite sign on that of the core particle.

In making the core pigment particle dispersion, an aqueous medium usually is employed. The charged carbon-containing ionic species such as the cationic or anionic polymers, are those that ionize in the medium. The charged species are also those that form, on ionization, anions or cations that are strongly adsorbed onto the surface of the pigments. As a result of this adsorption, the particles become positively or negatively charged, depending on the cationic or anionic nature, respectively, of the charge reversing agents. The ions are localized at the surface of the particles. The magnitude of the charge on a particle depends upon the number of ions adsorbed onto each particle, and upon the charge of each ion.

Other descriptions of electrostatic deposition of one material onto another by utilizing charge reversal can be found in Valtchev and Mintova, Microporous and Mesoporous Materials, 433 (2001), Wang et al., Chemical Communications, 2161 (2000) and Millward et al. Chemical Communications, 1994, (2002).

Anionic polymers which can be used as the charged carbon-containg species of the present invention include low, medium, and high molecular weight polymers, for example in the range of about 2,000 to about 500,000. Examples of polymeric species capable of forming large polyanions, when ionized, are well known. A preferred polymeric species is a water-soluble vinyl polymer, or an alkali metal or ammonium salt thereof, or an alkali metal or ammonium salt of polysilicic acid. Specific examples include poly(acrylic) acids, poly (methacrylic) acids, substituted poly(acrylic acid), substituted poly(methacrylic acid), or an alkali metal or an ammonium salt of any of these acids. One commercially available anionic species is sodium polyacrylate. Poly(sodium 4-styrene sulfonate) is available from National Starch and Chemical under the trademark "Flexan 130".

Examples of suitable cationic polymers useful in the present invention are disclosed in U.S. Pat. No. 5,006,574. One useful water-soluble cationic polymeric material is an alkyl diallyl quaternary ammonium polymer salt. This cationic polymer is characterized by a high density of positive charge. Preferably, the polymer does not have negative groups such as carboxyl or carbonyl groups.

U.S. Pat. No. 5,006,574 also discloses other quarternary ammonium cationic polymers obtained by copolymerizing an aliphatic secondary amine with epichlorohydrin. Still other water-soluble cationic polyelectrolytes are poly(quarternary ammonium) polyester salts that contain quaternary nitrogen in a polymeric backbone and are chain extended by the groups. They are prepared from water-soluble poly(quarternary ammonium salts) containing pendant hydroxyl groups and bi-functionally reactive chain extending agents. Such polyelectrolytes are prepared by treating N,N,N',N'-tetraalkylhydroxyalkylene diamine and an organic dihalide such as dihaloalkane or dihaloether with an epoxy haloalkane. Other water-soluble cationic polyelectrolytes are polyamines, such as for instance polyallylamine hydrochloride, and alkylphosphonium salts.

An example of the adsorption of a cationic water-soluble polymer onto a pigment particle from an aqueous dispersion is described in U.S. Pat. No. 4,874,466 for a process of forming an improved paper making filler composition. The polymer comprises at least 50 weight percent of repeating units consisting of an alkyl and/or aryl quarternary ammonium salt moiety, wherein the alkyl or aryl moieties may be substituted with hydroxy, amine or halide. Polyaluminum chloride and mixtures thereof with the alkyl and/or aryl ammonium salt polymers are also disclosed as useful cationic polymers. The disclosure of U.S. Pat. No. 4,874,466 is also incorporated by reference herein.

Cationic polymeric species are also commercially available. For instance a cationic oligomer is marketed by Calgon Corp. under the trademark "CALGON 261" and another marketed by Nalco Chemical Co. under the trademark "NALCO 7607."

After the substrate is coated with the carbon-containing ionic species such as a charged polymer, either cationic or anionic, it can be washed and optionally dried and then the procedure repeated with, for example, a polymer of opposite charge. Alternatively, the filtration (separation) and washing steps between treatments can be eliminated. In the latter procedure, after a suitable deposition time has elapsed for the first polymer, the second polymer is added with no intermediate filtration. The alternate coating steps can be repeated as many times as desired and the final coating can be cationic or anionic, as desired. At any time during the coating a plurality of times with a cationic or anionic agent, the identity of either (or both) particular agent can be changed if desired.

When the deposition process is completed, the sample is treated to form a carbonized coating on the substrate. For example, the sample can be pyrolyzed by thermal treatment in a controlled atmosphere. The temperature of the thermal treatment, the duration of the treatment and the atmosphere of the thermal treatment will vary depending on the particular compounds or polymers used to coat the substrate and on the substrate itself. In general, the treatment gas is nitrogen but other gases or gas mixtures such as carbon dioxide and nitrogen can also be used. The use of a nitrogen stream containing at least about 0.1% $CO_2$ is exemplified. The temperature employed is usually at least about 300° C., preferably at least about 600° C. and the heating is usually conducted for a duration ranging from 10 minutes to 10 hours, more typically ranging from 30 minutes to 2 hours at the final temperature. The maximum usable temperature is usually established by the stability of the core material which has been coated. The appearance of some effect pigments, for instance, iron oxide-coated mica, may be effected by the pyrolysis and the particular parameters of the treatment are selected to take that into account.

Scanning electron microscopy imaging of a carbon-coated effect pigment made in accordance with the present invention in which the effect pigment coated was a titanium dioxide-coated mica looked the same as the effect pigment prior to carbon coating. Nevertheless, the carbon-coated effect pigment exhibited enhanced hiding power compared to the effect pigment prior to coating either alone or admixed with carbon black at the same carbon level, and the three materials had different UV-visible spectra.

Since the coating after pyrolysis is derived from a carbon-containing material, the presence of carbon is expected and that has been confirmed by elemental analysis. XPS results indicated that the carbon coating is clearly observed while elements present in the effect material which has been coated can still be detected. The carbon coating realized is therefore very thin.

A wide range of carbon contents can be achieved by varying the number of coatings of the charge reversing agents. The carbon content can also be varied by varying the pyrolysis conditions. This flexibility in carbon content is important to achieve a range of optical properties.

The overall nitrogen content in the product of the invention can be so low that it is not accurately detected by routine carbon-hydrogen-nitrogen analysis. By using analysis techniques with a very low detection limit such as 1 ppm, a nitrogen content lower than about 1 wt. % of the carbon coating has been observed after subtracting the nitrogen content of the effect pigment coated. Nitrogen contents below 4 wt. % of the carbon coating are also useful.

After the substrate has been coated with the desired ionic polymer species, washed and dried, it has been found that acidification of the polymer surface prior to pyrolysis is a useful distinguishing feature. One consequence of acidification is that pyrolysis can be achieved with nitrogen in one step without the need for $CO_2$. This may be desirable in terms of processing costs and requirements. In addition, there may also be important consequences in terms of the properties of the resultant carbon-coated pigment compared with a pigment formed by pyrolysis in a mixed $CO_2/N_2$ gas stream. It is likely that the chemical nature of the surface of the material pyrolysed in $N_2$ only is different from that pyrolysed in $CO_2/N_2$. It has been found that heating polymer-coated substrates with acidification in a nitrogen atmosphere results in products having an increased carbon content compared with products formed without acidification.

In accordance with this aspect of the invention, after final polymer deposition, the coated pigment is isolated by filtration, washed and dried. Acidification of the dried material is accomplished by stirring the coated substrate in a dilute, aqueous mineral acid solution for 30 seconds to 2 hours, typically 1 to 45 minutes. The treated samples are filtered, washed and dried prior to pyrolysis. Mineral acids which can be used include sulfuric, nitric and phosphoric acids.

The carbon-coated pigment can be optionally coated with a wide variety of inorganic and organic coloring agents or dyestuffs. Examples are described, for instance, in U.S. Pat. Nos. 4,084,983; 4,755,229; 4,968,351; and 6,436,538.

The carbon-coated pigment may, if desired, contain absorption pigments, which are water insoluble, transparent (i.e. substantially non-light scattering) and which cannot be formed in situ from a water soluble reactant(s) but which may be highly dispersed in water or water-alcohol containing anionic polymer. These include, for example, organic pigments in the following groups: azo compounds. anthraquinones, perinones, perylenes, pyrroles such as diketopyrrolo pyrroles, quinacridones, thioindigos, dioxazines and phthalocyanines and their metal complexes. The absorption pigments, depending on their color intensity, are used in a concentration range of about 0.01% to about 30% based on the weight of platy substrate, preferably 0.1% to 10%.

As prepared, the carbon-coated materials may suffer from deterioration upon prolonged exposure to UV radiation. The UV stability of these materials can be enhanced by incorporation of metal oxides or complexes. Specific examples of such metal species include cerium (III) oxide and cerium (IV) oxide.

Pigments having improved humidity resistance and weatherability can be realized by a metal oxide-coated mica pigment which has an aluminum or an aluminum-cerium combined with a hydrolyzed silane coupling agent treated surface. Silane coupling agents such as aminosilanes, alkoxysilaned and aminoalkoxysilanes are useful. Commonly assigned U.S.

Pat. No. 5,759,255 describes these coatings and is herein incorporated by reference in its entirety.

Colors may be adjusted if desired by mixing combination pigments. In general, it is preferred to mix pigments of the same or similar reflection color, since reflection colors mix additively and color intensity is reduced when very different reflection colors are mixed. The absorption pigment components mix subtractively, and the usual pigment blending procedures are followed.

The products of the present invention can be used in any application where pearlescent pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. For automotive formulations, the weatherability treatment as described in U.S. Pat. No. 5,759,255 is particularly useful. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic and personal care field, these pigments can be used in the eye area and in all external and rinse-off applications. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

In order to further illustrate the present invention, a number of non-limiting examples are set forth below. In these, as well as throughout this specification and claims, all parts and percentages are by weight and all temperatures are in degrees centigrade, unless otherwise indicated.

Example 1

A 1% w/w solution of poly(diallyldimethyl ammonium chloride) (PDADMAC) in 0.1 M NaCl was prepared, and the pH adjusted to 9.5 using a 0.1 M ammonia solution. To 100 ml of this solution, 20 g of either $TiO_2$-coated mica of 50 μm particle size, 20 μm platy mica or 100 μm $TiO_2$-coated glass flakes was added, and the mixture stirred for 15 minutes at room temperature. After 15 minutes, the substrate was recovered by filtration and washed with an excess of deionized water. This polymer treatment conferred a positive charge on the substrate.

The substrate was then slurried in 100 ml of a 1% w/w solution of poly(sodium 4-styrene sulfonate) (PSS) in 0.1 M NaCl, adjusted to pH 9.5 using 0.1 M ammonia for 15 minutes at room temperature and under continuous agitation. Following this treatment, the substrate was collected by filtration and washed with deionized water to remove excess, unattached polymer.

One treatment with PDADMAC followed by one treatment with PSS was defined as 1 treatment cycle. The treatment cycle was repeated and after each subsequent treatment cycle, a portion of the material was retained for pyrolysis and subsequent analysis. This allowed the deposition reaction to be examined as a function of the number of treatment cycles.

Samples were placed in a box furnace, and flowing nitrogen at 10 liters/min was introduced into the furnace. Samples were heated to the target temperature over 2 hours and held at the target temperature for 3 hours. The samples were then furnace cooled to ambient temperature, and removed from the furnace. Elemental analyses were performed on the samples after pyrolysis to determine the weight percentages of carbon. In addition, drawdown films were prepared to evaluate the influence of the carbon coating on the hiding power. Asia reference point, a drawdown film was prepared using a pigment content comprised of 1% carbon black and 99% the same substrate (effect pigment). Visual inspection revealed that the carbon in the reference drawdown was more jet-black than that produced by precursor pyrolysis, which possessed more of a brown shade.

Table 1 details the carbon levels for three different substrates at various pyrolysis temperatures for five treatment cycles.

TABLE 1

|  | % C in $TiO_2$-coated mica, 50 μm | % C in Platy Mica, 20 μm | % C in $TiO_2$-Coated Glass Flakes, 100 μm |
|---|---|---|---|
| Untreated | 0.01 | 0.016 | N/A |
| Polymer Coated (unheated) | 0.995 | 2.13 | 0.203 |
| 350° C., $N_2$ | 0.722 | 1.41 | 0.142 |

TABLE 1-continued

| | % C in TiO$_2$-coated mica, 50 μm | % C in Platy Mica, 20 μm | % C in TiO$_2$-Coated Glass Flakes, 100 μm |
|---|---|---|---|
| 375° C., N$_2$ | 0.663 | 1.14 | 0.125 |
| 400° C., N$_2$ | 0.556 | 0.929 | 0.093 |
| 425° C., N$_2$ | 0.403 | 0.778 | 0.045 |
| 450° C., N$_2$ | 0.157 | 0.437 | 0.016 |
| 500° C., N$_2$ | 0.10 | 0.019 | N/A |

Example 2

The polymer deposition procedure as carried out in Example 1 was performed on a TiO$_2$-coated mica having a particle size of approximately 20 μm, a TiO$_2$-coated mica having a particle size of approximately 50 μm and TiO$_2$-coated borosilicate glass flakes having a particle size approximately 100 μm. Following polymer deposition, pyrolysis was performed at various temperatures using a gaseous flow comprised of 1% CO$_2$ in N$_2$, as opposed to the pure nitrogen atmosphere used in Example 1 above. Following this pyrolysis, elemental analyses were performed to determine the carbon contents of the materials. These analyses are summarized in Tables 2a, 2b and 2c. In addition, drawdown films were prepared to evaluate the jet-black nature of the carbon coating produced. Inspection revealed that the carbon color was of jet-black color similar to that of the reference drawdown film. Elemental analysis also showed that more of the carbon was retained at elevated temperatures than with pyrolysis in nitrogen.

TABLE 2

| Substrate | 450° C. % C | 500° C. % C | 550° C. % C |
|---|---|---|---|
| TiO$_2$-coated mica, 20 μm | 0.614 | 0.622 | 0.569 |
| TiO$_2$-coated mica, 50 μm | 0.539 | 0.520 | 0.539 |
| TiO$_2$-coated Glass Flakes, 100 μm | 0.109 | 0.094 | 0.091 |

Example 3

Polymer deposition and subsequent pyrolysis to produce a carbon coating was performed on an iron oxide-coated mica using the procedure set forth in Example 1. Following multiple polymer deposition steps, pyrolysis at 600° C. in CO$_2$/N$_2$ for two hours produced a dark brown sample that was magnetic. X-ray diffraction data were used to confirm that reduction of the Fe (III) had taken place to yield Fe$_3$O$_4$, a mixed Fe (II, III) oxide. Visual inspection of drawdown films prepared from these materials indicates that the level of polymer deposition influences the degree of iron reduction. Further, heating the substrate with no added polymer at 600° C. in CO$_2$/N$_2$ for two hours also seems to promote a color change in the material. The hiding power of the treated materials with some Fe$_3$O$_4$ content is greater than the untreated material.

Example 4

A 1% w/w solution of PDADMAC in 0.1 M NaCl was prepared, and the pH adjusted to about 9 using a 0.1 M ammonia solution. To 100 ml of this solution, 20 g of a TiO$_2$-coated mica (Magnapearl® 1000 product commercially available from ENGELHARD) was added, and the mixture stirred for 15 minutes at room temperature. After 15 minutes, the substrate was recovered by filtration and washed with an excess of deionized water. The substrate was then slurred in 100 ml of a 1% w/w solution of PSS in 0.1 M NaCl adjusted to pH about 9 using 0.1 M ammonia and stirred for 15 minutes at room temperature. Following this treatment, the substrate was collected by filtration and washed with deionized water to remove excess, unattached polymer. The substrate was then subjected to repeat alternating treatments with PDADMAC and PSS to a total of five treatments with each polymer.

After the final filtration and washing, the sample was dried in air at 90° C. overnight. The sample was then heated in a flowing gas stream of composition 7.4% CO$_2$/92.6% N$_2$ to 600° C. in two hours and held at 600° C. for two hours, at which point the CO$_2$ flow was stopped. The sample was then cooled in flowing nitrogen to room temperature. The final product was a silver powder containing 0.73% w/w carbon.

The final product was incorporated into a nitrocellulose-based lacquer formulation, and drawn into a film. This was compared with a film prepared using a formulation containing the same uncoated TiO$_2$-coated mica and 1% w/w carbon black. The carbon-coated material with 0.73% w/w carbon matched well with the formulation containing 1% w/w carbon blend introduced as a blend.

Example 5

A carbon coating was prepared according to Example 4, except that Magnapearl® 1000 was replaced by Magnapearl® 4000 product (commercially available from ENGELHARD). The final product was a silver powder, containing 0.52% w/w carbon.

Example 6

A carbon coating was prepared according to Example 4, except that Magnapearl® 1000 was replaced by Firemist™ TiO$_2$-coated glass flake (commercially available from ENGELHARD). The final product was a silver powder, containing 0.11% w/w carbon.

Example 7

A carbon coating was prepared according to Example 4, except that Magnapearl® 1000 was replaced by Mearlin® Hi-Lite Super Gold (commercially available from ENGELHARD). The final product is an intense gold powder, containing 0.78% w/w carbon.

The final product was incorporated into a nitrocellulose-based lacquer formulation, and drawn into a film. This was compared with a film prepared using a formulation of the Mearlin® Hi-Lite Super Gold containing 0.75% w/w carbon black. The carbon-coated material with 0.78% w/w carbon has an intense gold interference color, and improved color properties at steep viewing angles compared with a physical blend containing 0.75% carbon black.

Example 8

A carbon coating was prepared according to Example 4, except that Magnapearl® 1000 was replaced by Mearlin®

Hi-Lite Super Blue (commercially available from ENGELHARD). The final product is an intense blue powder, containing 0.72% w/w carbon.

The final product was incorporated into a nitrocellulose-based lacquer formulation, and drawn into a film. This was compared with a film prepared using a Mearlin® Hi-Lite Super Blue formulation containing 0.75% w/w carbon black. The carbon-coated material with 0.72% w/w carbon has an intense blue interference color, and improved color properties at steep viewing angles compared with a physical blend containing 0.75% carbon black.

Example 9

A carbon coating was prepared according to Example 4, except that Magnapearl® 1000 was replaced by Mearlin® Hi-Lite Super Red (commercially available from ENGELHARD). The final product is an intense red powder, containing 0.78% w/w carbon.

The final product was incorporated into a nitrocellulose-based lacquer formulation, and drawn into a film. This was compared with a film prepared using a formulation containing the initial pigment combined with 0.75% w/w carbon black. The carbon-coated material with 0.78% w/w carbon has an intense red interference color, and improved color properties at steep viewing angles compared with a physical blend containing 0.75% carbon black.

Example 10

A carbon coating was prepared according to Example 4, except that Magnapearl® 1000 was replaced by Mearlin® Hi-Lite Super Green (commercially available from ENGELHARD). The final product is an intense green powder, containing 0.56% w/w carbon.

The final product was incorporated into a nitrocellulose-based lacquer formulation, and drawn into a film. This was compared with a film prepared using a formulation containing 1% w/w carbon black. The carbon-coated material with 0.56% w/w carbon has an intense green interference color, and improved color properties at steep viewing angles compared with a physical blend containing 1% carbon black.

Example 11

A carbon coating was prepared on the $TiO_2$ coated mica according to Example 4, except that the gas composition for heating was 1% $CO_2$/99% $N_2$. The final product was a silver powder containing 0.73% w/w/carbon.

Example 12

A carbon coating was prepared according to Example 11, except that Magnapearl® 1000 was replaced by Magnapearl® 2000 product (commercially available from ENGELHARD), and the substrate was subjected to only two treatments with each polymer, applied in an alternating manner as PDADMAC, PSS, PDADMAC and PSS. The final product was dark silver in color, and contained 0.68% w/w carbon of the total product. The nitrogen content was 105 ppm of the total product, corresponding to 1.52% w/w nitrogen in the coating based upon carbon and nitrogen only.

Example 13

A carbon coating was prepared according to Example 11, except that Magnapearl® 1000 was replaced by Magnapearl® 3000 product (commercially available from ENGELHARD), and the substrate was subjected to alternate treatments with PDADMAC and PSS. The final products were dark silver in color, and their carbon contents (% w/w carbon) are 0.52, 0.83, 1.21, 1.65 and 1.80 for 1 through 5 polymer treatment cycles, respectively. One polymer treatment cycle is defined as (PDADMAC+PSS).

Example 14

A carbon-coated effect material using Mearlin® Hi-Lite Super Gold product was prepared according to Example 13, except that samples were taken at the end of the second, fourth, sixth, eighth and tenth polymer treatment cycles. After filtration and washing, each sample was dried in air at 90° C. overnight. The samples were then heated in a flowing gas stream containing 7.4% $CO_2$/92.6% $N_2$ to 600° C. in two hours and held at 600° C. for two hours, at which point the $CO_2$ flow was stopped. The samples were then cooled in flowing nitrogen to room temperature.

The carbon content of each sample were determined by elemental analyses and the results are summarized in the following Table, where n represents the number of (PDADMAC+PSS) polymer treatment cycles.

|  | n | | | | |
| --- | --- | --- | --- | --- | --- |
|  | 2 | 4 | 6 | 8 | 10 |
| % C w/w | 0.36 | 0.76 | 1.17 | 1.59 | 2.08 |

Figure 2:
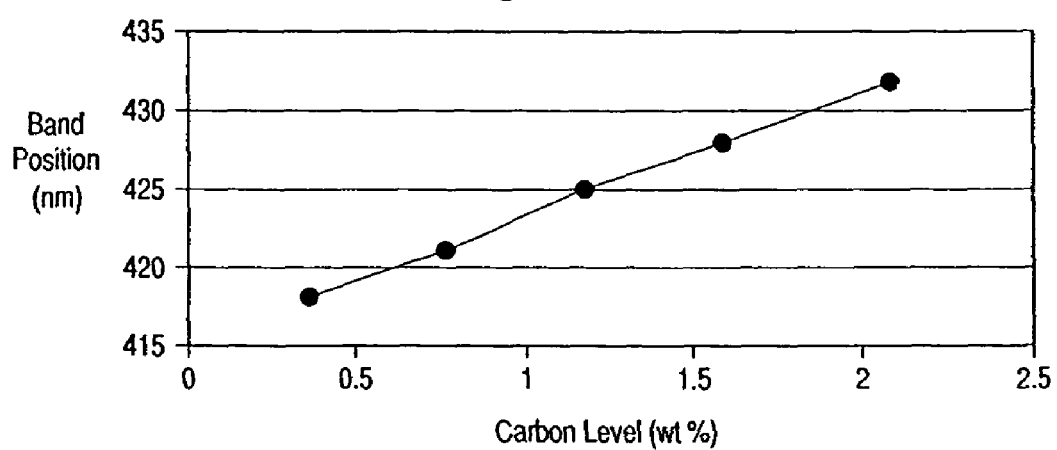
FIG. 2 shows the influence of carbon content on spectral peak position for the first carbon-coated effect pigment.

UV/Visible spectroscopy was performed on these samples and the influence of carbon content on the spectra was examined. FIG. 1 shows a plot of the intensity of the peak at approximately 425 nm as a function of carbon level. FIG. 2 shows a plot of spectral peak position as a function of carbon content.

Example 15

A carbon-coated effect material was prepared by slurring 20 g of Magnapearl® 4000 in 100 ml of 0.1 M NaCl, and adjusting the pH to about 9. To this was added 0.135 g of 20% w/w aqueous PDADMAC, and the mixture stirred for 15 minutes. Then without any intermediate filtration or washing, 0.0403 g of PSS was added and the mixture stirred for 15 minutes. This procedure was repeated with the PDADMAC and PSS added alternately with 15 minutes between subsequent additions. After 5 total additions of each polymer, the substrate was collected by filtration and washed with deionized water. After filtration and washing, the sample was dried in air at 90° C. overnight. The sample was then heated in a flowing gas stream containing 7.4% $CO_2$/92.6% $N_2$ to 600° C. in two hours and held at 600° C. for two hours, at which point the $CO_2$ flow was stopped. The sample was then cooled in flowing nitrogen to room temperature. The final product was a silver powder containing 0.31% w/w carbon.

Example 16

Figure 3:
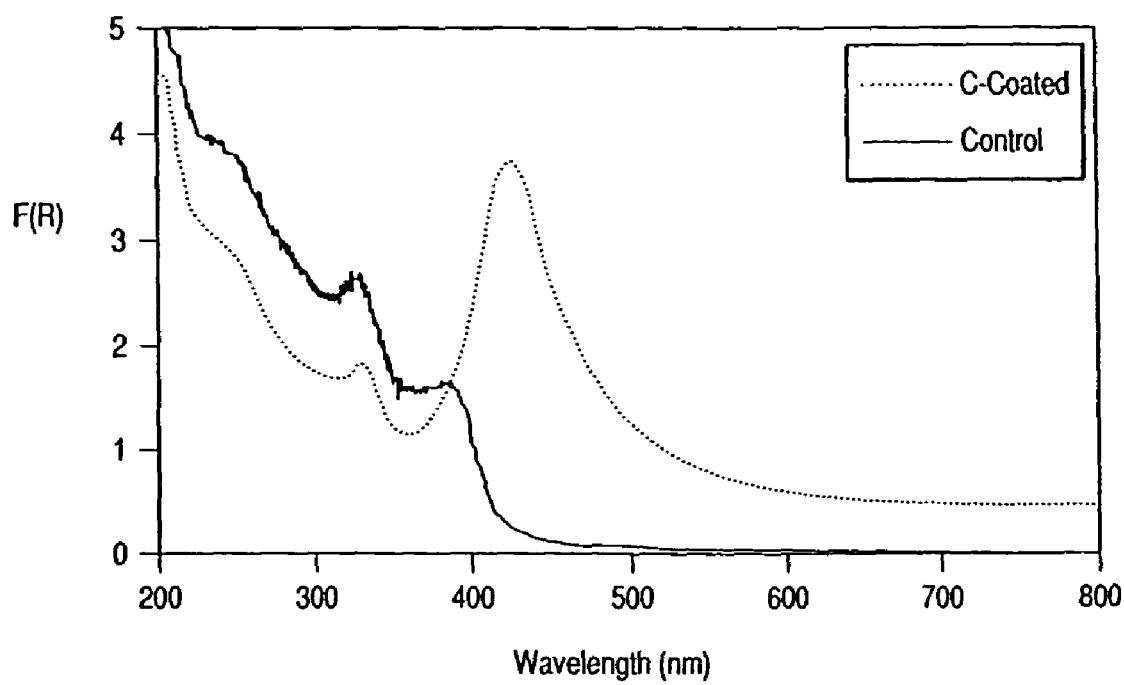
FIG. 3 shows the UV-Vis spectra for a carbon-coated and uncoated first effect pigment.

A carbon coating was prepared according to Example 15, except that the Magnapearl® 4000 was replaced by Mearlin® Hi-Lite Super Gold product, and 1% w/w solutions of each polymer in 0.1 M NaCl were employed for each polymer addition. For the PDAMAC, 3.42 g of this 1% solution was added per 20 g of substrate, and 5.38 g 1% w/w PSS solution was added per 20 g of substrate. There was no filtration or washing between successive polymer deposition steps. After ten (PDADMAC+PSS) alternating polymer depositions, the deposition process was stopped, and the substrate collected by filtration, washed with deionized water and the sample was dried in air at 90° C. overnight. The sample was then heated in a flowing gas stream containing 7.4% $CO_2$ and 92.6% $N_2$ to 600° C. in two hours and held at 600° C. for two hours, at which point the $CO_2$ flow was stopped. The sample was then cooled in flowing nitrogen to room temperature. The final product was an intense gold powder containing 0.84% w/w carbon. The UV/Vis spectrum of this material is shown in FIG. 3, in addition to that of the unmodified Mearlin Hi-Lite Super Gold (control).

Example 17

Figure 4:
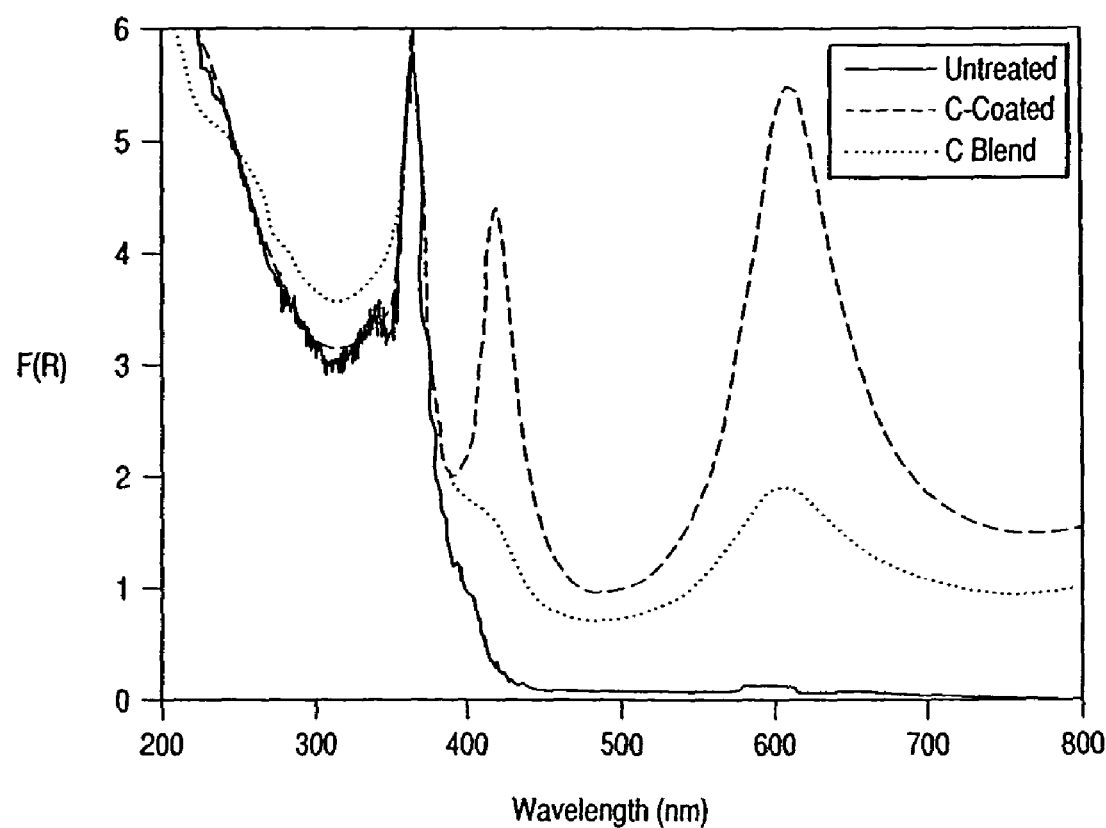
FIG. 4 shows the UV-Vis spectrum of a physical mixture of carbon black with a second effect pigment, that of its carbon-coated analog, and the effect pigment itself.

A carbon coated effect material was prepared according to Example 16, except that the Mearlin® Hi-Lite Super Gold was replaced by Lumina® Turquoise product. Following pyrolysis, the powdered product was an intense turquoise color and had a carbon content of 0.66% w/w. The UV-visible spectrum of this material is shown in FIG. 4, which also shows the spectrum of a physical blend of carbon black and unmodified Lumina® Turquoise at a carbon level of 0.75% w/w. The addition of carbon to Lumina® Turquoise either by coating or physical blending produces two new absorption bands having similar positions. However, the band intensity, F(R), of the carbon-coated Lumina® Turquoise is much stronger than that of the mechanically blended carbon black/Lumina® Turquoise. This shows that carbon-coated effect materials display enhanced color strength compared with those obtained by mechanically blending with an equivalent of carbon black.

Example 18

Figure 5:
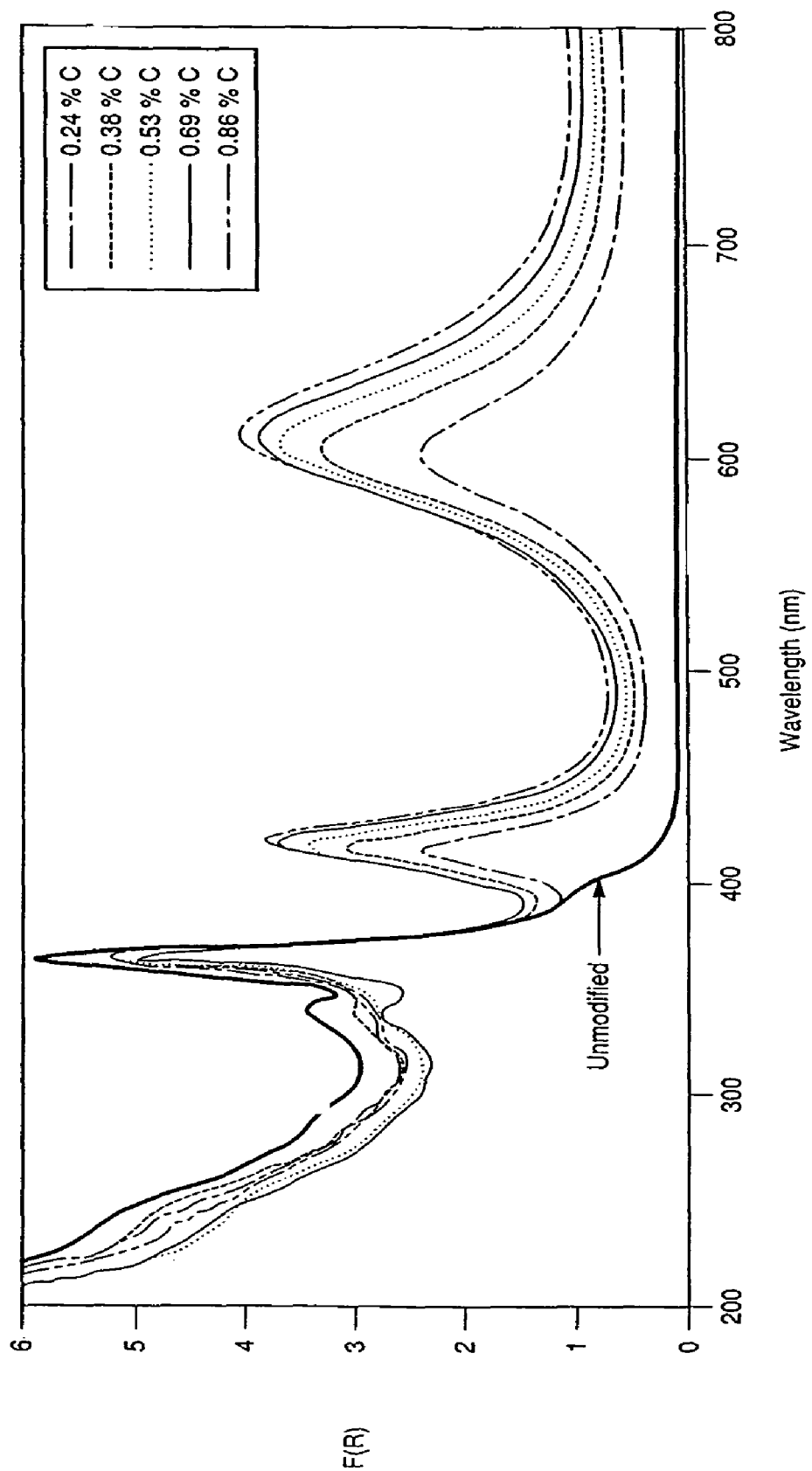
FIG. 5 shows the UV-Vis spectra for the second carbon-coated effect pigment with varying carbon levels.
Figure 6:
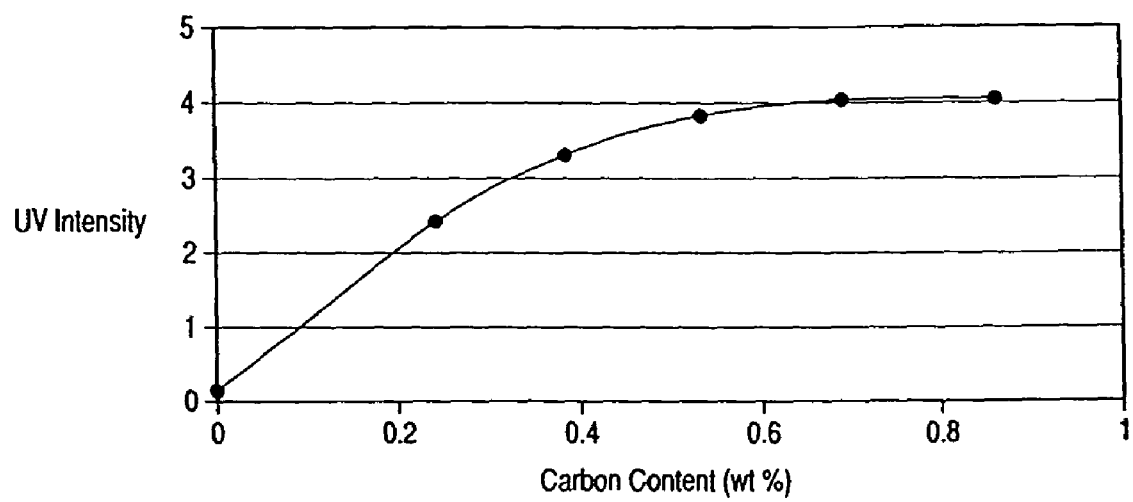
FIG. 6 shows the influence of carbon content on the intensity of the UV-Vis band at approximately 600 nm for the second carbon-coated effect pigment.
Figure 7:
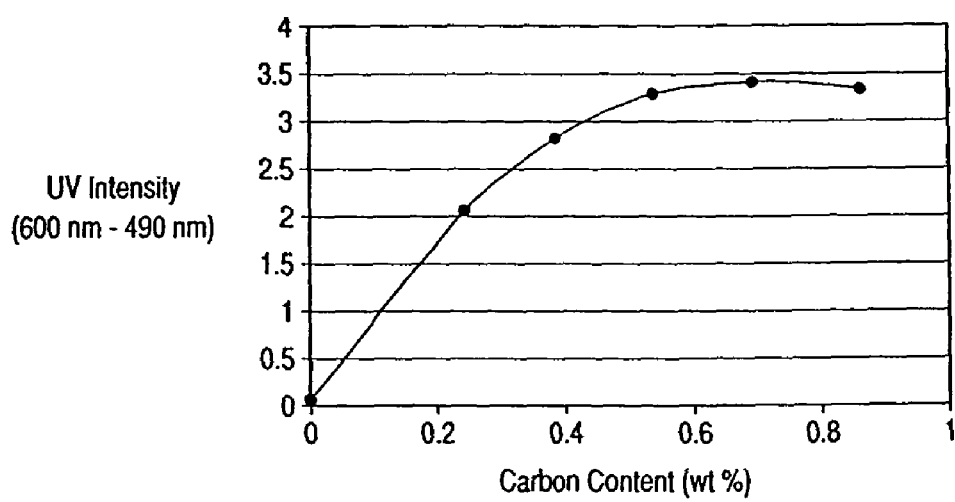
FIG. 7 plots the intensity difference between the UV-Vis features at approximately 600 nm and 490 nm for the second carbon-coated effect pigment.

The procedure of Example 17 was repeated to different carbon contents by varying the number of (PDADMAC+PSS) treatment cycles from 2 to 10. The UV spectra of these products is plotted in FIG. 5 and the intensity of the peak at about 600 nm as a function of carbon level is set forth in FIG. 6. In addition, the intensity difference between the UV/Vis features at approximately 600 nm and 490 nm was plotted with varying carbon content as shown in FIG. 7. The band intensity increases as the carbon content increases from 0.24 to 0.53% and then levels off when the carbon content further increases from 0.53 to 0.86%. This indicates a preferred carbon level for optical enhancement, beyond which no apparent advantage is gained, and additional carbon may even be detrimental in terms of color properties.

Figure 8:
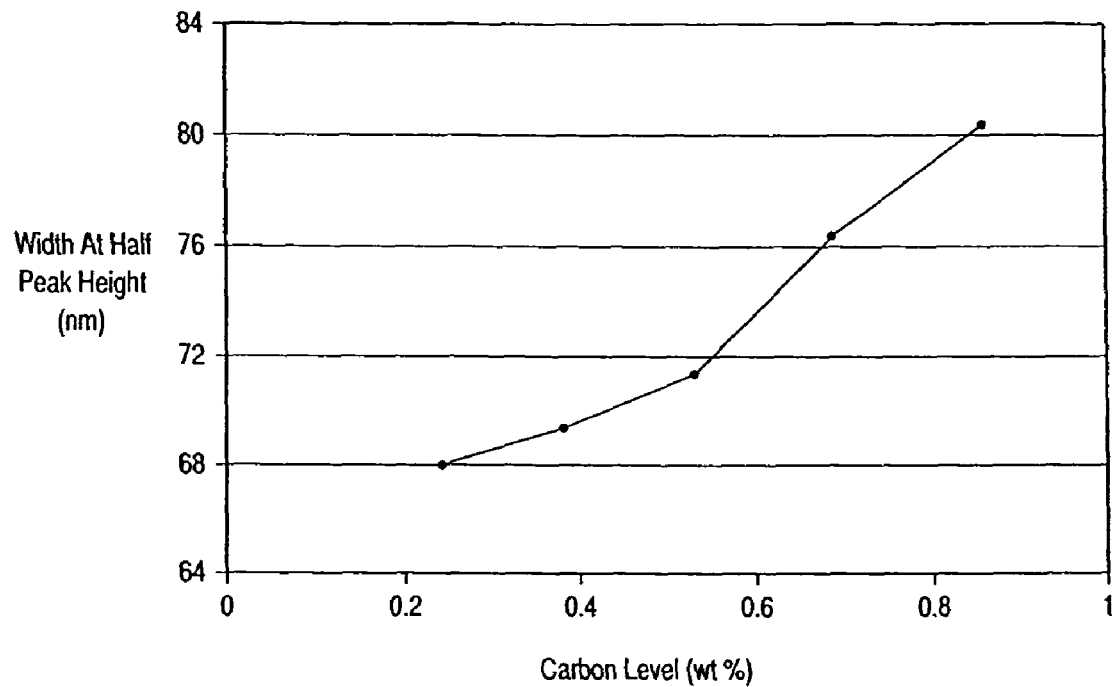
FIG. 8 shows the change in UV peak width relative to carbon content for the second carbon-coated effect pigment.
Figure 9:
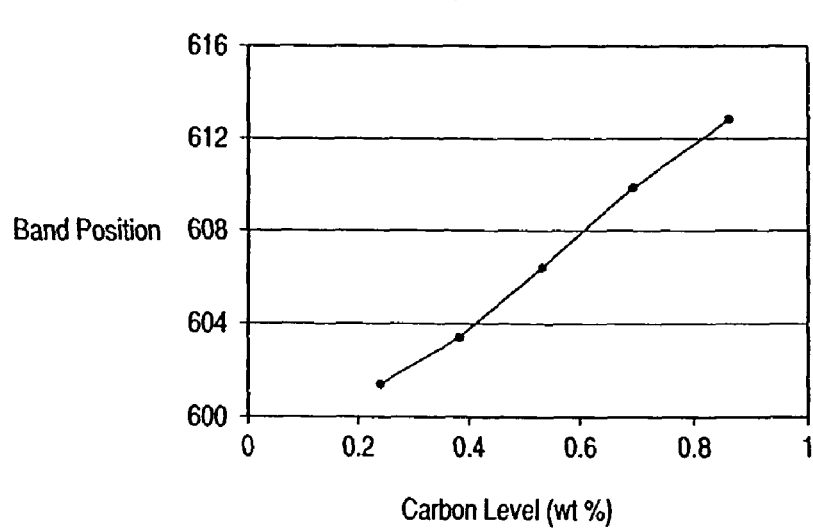
FIG. 9 plots the UV band position as a function of carbon content for the second carbon-coated effect pigment.

FIG. 8 shows the change of band width (at half peak height) with the carbon content for carbon-coated Lumina® Turquoise and indicates that as the carbon content increases, so does the band width. FIG. 9 gives the plot of band position with the carbon content.

Example 19

Figure 10:
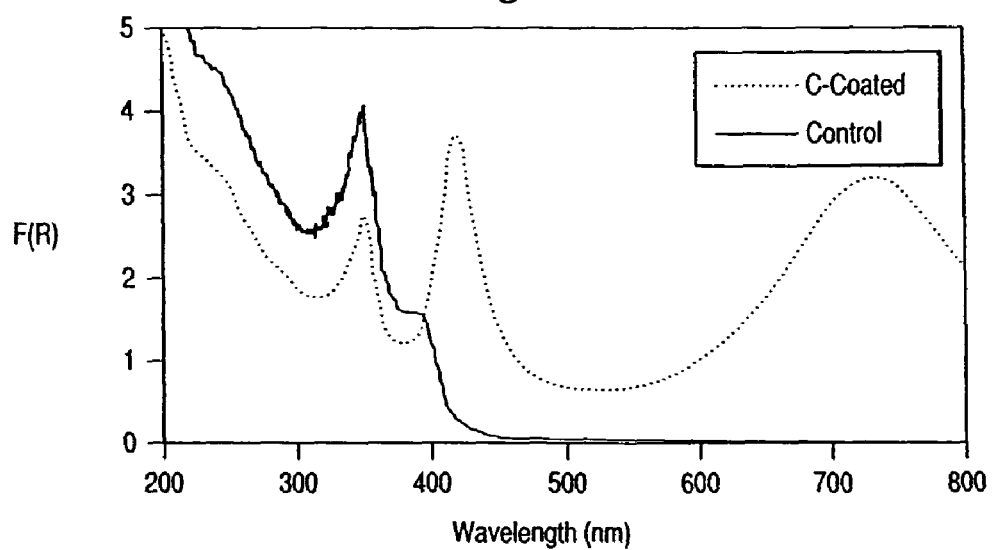
FIG. 10 shows the UV-Vis spectra for a third carbon-coated effect pigment.

A carbon coated effect material was prepared according to Example 16, except that the Mearlin® Hi-Lite Super Gold was replaced by Mearlin® Hi-Lite Super Green product. Following pyrolysis, the powdered product was an intense green color with a carbon content of 0.75% w/w. The UV-visible spectrum of this material is shown in FIG. 10, which also shows the spectrum of the unmodified Mearlin® Hi-Lite Super Green (control).

Example 20

Figure 11:
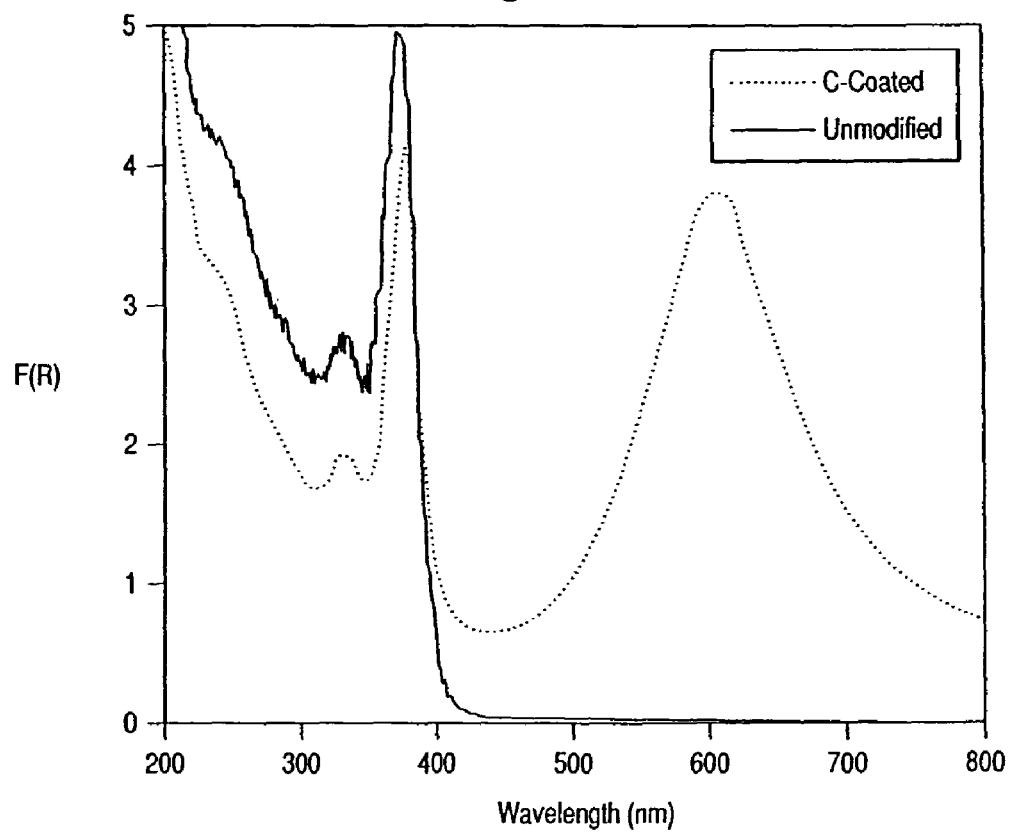
FIG. 11 shows the UV-Vis spectra for a fourth carbon-coated effect pigment.

A carbon coated effect material was prepared according to Example 16, except that the Mearlin® Hi-Lite Super Gold was replaced by Mearlin® Hi-Lite Super Blue product. Following pyrolysis, the powdered product was an intense blue color and had a carbon content of 0.77% w/w. The UV-visible spectrum of this material and that of the unmodified Mearlin® Hi-Lite Super Blue are shown in FIG. 11 (control).

Example 21

The carbon coated material produced in Example 20 was further treated with a weatherability treatment in accordance with commonly assigned U.S. Pat. No. 5,759,255 incorporated herein by reference.

Example 22

The carbon coated effect material of Example 20 was incorporated into a powder eye shadow of the following formulation:

| Ingredients | wt parts |
| --- | --- |
| Talc | 19.4 |
| Mearlmica ® SVA product | 15.0 |
| Magnesium Myristate | 5.0 |
| Silica | 2.0 |
| Preservatives | 0.5 |
| Product of example 20 | 50.0 |
| Octyl Palmitate | 7.0 |
| Isostearyl Neopentanoate | 1.0 |
| BHT | 0.1 |

For comparative purposes, the formulation was repeated where the product of Example 20 was replaced with a physical blend of Hi Lite Super Blue and 0.25% carbon black pigment. When wiped off the skin, the blended pigments leaves a residue behind, while the carbon-coated pigment does not.

Example 23

The carbon coated effect material of Example 20 was incorporated into a nail enamel of the following formulation:

| Ingredients | wt parts |
| --- | --- |
| Suspending lacquer SLF-28 | 2.0 |
| Product of Example 20 | 3.0 |
| Lacquer 127P | 10.5 |
| Polynex B-75 | 2.5 |
| Ethyl Acetate | 2.0 |

Example 24

A charge of 1.0 wt % of the product of Example 17 was added to polypropylene and dispersed therein and injected molded into a flat plaque.

Example 25

The carbon coated pigment of Example 17 was incorporated into a water based paint composition at a pigment/paint ratio of 0.13. The paint was sprayed onto a primed steel panel to about 15-20 microns. This base coat was allowed to flash for at least 10 minutes, and then baked at 85° C. for 6.5 minutes before cooling. A clearcoat was then applied to a thickness of 40-45 microns and the resulting panel was baked at 140° C. for 30 minutes.

Example 26

The carbon-coated effect material of Example 17 was sprayed at 3.5 wt % loading in a polyester TGIC power coating using a corona gun over a RAL 9005 black powder sprayed base. For comparative purposes, the powder coating process was repeated except that the effect material was replaced by a blend of Lumina® Turquoise product and carbon black. The coating using the carbon-coated effect pigment has higher chroma and a cleaner color compared to the coating using the mixture. Also, the coating using the carbon-coated effect pigment retained the intense turquoise color at more diffuse angles while the coating using the mixture became washed out by a blue-gray haze.

Example 27

A carbon-coated effect material was prepared as described in Example 16, except that the effect pigment used was Lumina® Pearl Radiance 130D Silver. The carbon content of the product was 0.75% w/w, and the nitrogen content was 215 ppm, corresponding to 2.79% w/w of nitrogen in the coating based upon carbon and nitrogen only.

Example 28

The pigment of this invention can be formulated into a powder eye shadow by thoroughly blending and dispersing the following materials:

| Ingredients | wt parts |
| --- | --- |
| Mearltalc TCA ® (Talc) | 18 |
| Mearlmica ® SVA (Mica) | 20 |
| Magnesium Myristate | 5 |
| Silica | 2 |
| Cloisonné ® Red 424C (red $TiO_2$-coated mica) | 20 |
| Cloisonné ® Violet 525C (violet $TiO_2$-coated mica) | 13 |
| Cloisonné ® Nu-Antique Blue 626CB ($TiO_2$-coated mica/iron oxide-coated mica) | 2 |
| Cloisonné ® Cerise Flambé 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne® Red 424C and 5 parts of the pigment of this invention added and mixed until a uniform powder eye shadow is obtained.

Example 29

The pigment can be formulated into a lipstick by placing the following amounts of the listed ingredients into a heated vessel and raising the temperature to 85±3° C.:

| Ingredients | wt parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| *Aloe Vera* | 1.00 |
| Castor Oil | 37.50 |
| Red 6 Lake | 0.25 |
| Tocopheryl Acetate | 0.20 |
| Phenoxyethanol, Isopropylparaben, and butylparaben | 1.00 |
| Antioxidant | q.s. |

A mixture of 13 parts of the pigment of this invention and 1 part of kaolin are added and mixed until all of the pigment is well dispersed. Fragrance is added as desired and mixed with stirring. The resulting mixture is poured into molds at 75±5° C., allowed to cool and flamed into lipsticks.

Example 30

Carbon coated effect materials were prepared according to Example 7 except that the effect pigment slurry and polymer solutions were used at pH 7, and the polymer-coated materials were pyrolysed at 600° C. in a gas stream comprising 1% $CO_2$/99% $N_2$. Following pyrolysis, the carbon contents (% w/w carbon) were 0.16, 0.30, 0.48, 0.66 and 0.86 for 1 through 5 polymer treatments respectively.

Example 31

Carbon coated effect materials were prepared according to Example 30, except that the polymer-coated materials were pyrolysed at 650° C. in a gas stream comprising 1% $CO_2$/99% $N_2$. Following pyrolysis, the carbon contents (% w/w carbon) were 0.09, 0.24, 0.44, 0.63 and 0.80 for 1 through 5 polymer treatments respectively.

Example 32

Carbon coated effect materials were prepared according to Example 30 except that the effect pigment slurry and polymer solutions were used at pH 5. Following pyrolysis, the carbon contents (% w/w carbon) were 0.16, 0.32, 0.49, 0.70 and 0.90 for 1 through 5 polymer treatments respectively.

Example 33

Carbon coated effect materials were prepared according to Example 32 except that the polymer-coated materials were pyrolysed at 650° C. in a gas stream comprising 1% $CO_2$/99% $N_2$. Following pyrolysis, the carbon contents (% w/w carbon) were 0.10, 0.24, 0.41, 0.60 and 0.81 for 1 through 5 polymer treatments respectively.

Example 34

A carbon-coated Mearlin® Hi-Lite Super Gold was prepared according to Example 16 except that polymer deposition was limited to five alternating polymer deposition cycles, where one cycle is defined as (PDADMAC+PSS). After pyrolysis, the final product contained 0.41% w/w carbon.

Example 35

4.44 g of the carbon-coated product from Example 34 was slurried in 0.1 M NaCl aqueous solution to a total volume of 100 ml, and the pH adjusted to ~9. To this was added 0.76 g of a solution comprising 1% w/w of PDADMAC in 0.1 M aqueous NaCl, and the mixture stirred for 5 minutes. 1.19 g of a solution comprising 1% w/w of PSS in 0.1 M aqueous NaCl was added to this mixture with no intermediate filtration or washing, and the mixture stirred at room temperature for 5 minutes. The same quantities of PDADMAC and PSS were added alternately with 5 minutes in between subsequent additions. After 5 total additions of each polymer, the substrate was collected by filtration and washed with deionized water. After filtration and washing, the sample was dried in air at 90° C. overnight. The sample was then heated in a flowing gas stream of composition 1% $CO_2$/99% $N_2$ to 600° C. in two hours and held at 600° C. for two hours, at which point the $CO_2$ flow was stopped. The sample was then cooled in flowing nitrogen to room temperature. The final product was an intense gold powder containing 1.78% w/w carbon.

Example 36

110 g of commercially available $TiO_2$ coated mica (Lumina Red Blue, 9B30D) was slurried in 990 ml of 0.01 M NaCl, and the slurry maintained under constant agitation. To this slurry was added 10.0 g of 1% w/w aqueous PDADMAC (average molecular weight 100,000-200,000) in 0.01 M NaCl, and the mixture stirred for 5 minutes. Then without any intermediate filtration or washing, 20.0 g of 1% w/w aqueous PSS (average molecular weight 70,000) in 0.01 M NaCl was added and the mixture stirred for 5 minutes. Measured amounts of PDADMAC and PSS polymers were added in an alternating manner until a total of eight additions of each polymer had been completed. The amounts of each polymer used per addition as a 1% w/w polymer in 0.01 M NaCl are detailed in the table below:

| Polymer Deposition Number | Amount of PDADMAC per deposition/g | Amount of PSS Per Deposition/g |
|---|---|---|
| 1 | 10.0 | 20.0 |
| 2 | 12.5 | 22.5 |
| 3 | 15.0 | 22.5 |
| 4 | 15.0 | 22.5 |
| 5 | 17.5 | 25.0 |
| 6 | 20.0 | 27.5 |
| 7 | 20.0 | 30.0 |
| 8 | 22.5 | 30.0 |

After eight alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. Elemental analysis performed on the sample after pyrolysis indicated a carbon content of 0.66% w/w. The material was an intense red-blue color after pyrolysis.

Example 37

11 g of commercially available $TiO_2$ coated mica (Lumina Red Blue, 9B30D) was slurried in 99 ml of 0.01 M NaCl, and the pH adjusted to approximately 9. The slurry was maintained under constant agitation. To this slurry was added 2.0 g of 1% w/w aqueous PDADMAC (average molecular weight 400,000-500,000) in 0.1 M NaCl, and the mixture stirred for 5 minutes. Then without any intermediate filtration or washing, 3.0 g of 1% w/w aqueous PSS (average molecular weight 70,000) in 0.1 M NaCl was added and the mixture stirred for 5 minutes. Measured amounts of PDADMAC and PSS polymers were added in an alternating manner until a total of four additions of each polymer had been completed. The amounts of each polymer used per addition as a 1% w/w polymer in 0.1 M NaCl are detailed in the table below:

| Polymer Deposition Number | Amount of PDADMAC per deposition/g | Amount of PSS Per Deposition/g |
|---|---|---|
| 1 | 2.0 | 3.0 |
| 2 | 2.0 | 3.5 |
| 3 | 2.0 | 3.75 |
| 4 | 2.25 | 4.25 |

After four alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. Elemental analysis performed on the sample after pyrolysis indicated a carbon content of 0.46% w/w. The material was an intense red-blue color after pyrolysis.

Example 38

A material was prepared as described in Example 37, except that the polymer deposition was continued until six depositions of each of the polymers, PDADMAC and PSS, had been applied in an alternating manner. The amounts of each polymer used per addition as a 1% w/w polymer in 0.1 M NaCl are detailed in the table below:

| Polymer Deposition Number | Amount of PDADMAC per deposition/g | Amount of PSS Per Deposition/g |
|---|---|---|
| 1 | 2.0 | 3.0 |
| 2 | 2.0 | 3.5 |
| 3 | 2.0 | 3.75 |
| 4 | 2.25 | 4.25 |
| 5 | 2.75 | 4.5 |
| 6 | 3.0 | 5.0 |

After six alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. Elemental analysis performed on the sample after pyrolysis indicated a carbon content of 0.79% w/w. The material was an intense red-blue color after pyrolysis.

Example 39

10 g of commercially available $TiO_2$ coated mica (Lumina Red Blue, 9B30D) was slurried in 90 ml of 0.1 M NaCl, and the pH adjusted to approximately 9. The slurry was maintained under constant agitation. To this slurry was added 2.52 g of 1% w/w aqueous PDADMAC (average molecular weight 100,000-200,000) in 0.1 M NaCl at pH 9, and the mixture stirred for 5 minutes. Then without any intermediate filtration or washing, 3.22 g of 1% w/w aqueous PSS (average molecular weight 70,000) in 0.1 M NaCl at pH 9 was added and the mixture stirred for 5 minutes. Repeat additions of 2.52 g PDADMAC and 3.22 g PSS polymers were added in an alternating manner until a total of six additions of each polymer had been completed.

After six alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. Elemental analysis performed on the sample after pyrolysis indicated a carbon content of 0.77% w/w. The material was an intense red-blue color after pyrolysis.

Example 40

UV-Visible spectroscopy was used to investigate the color intensity, F(R), of Examples 36-39. These results are shown in FIG. 12.

Figure 12:
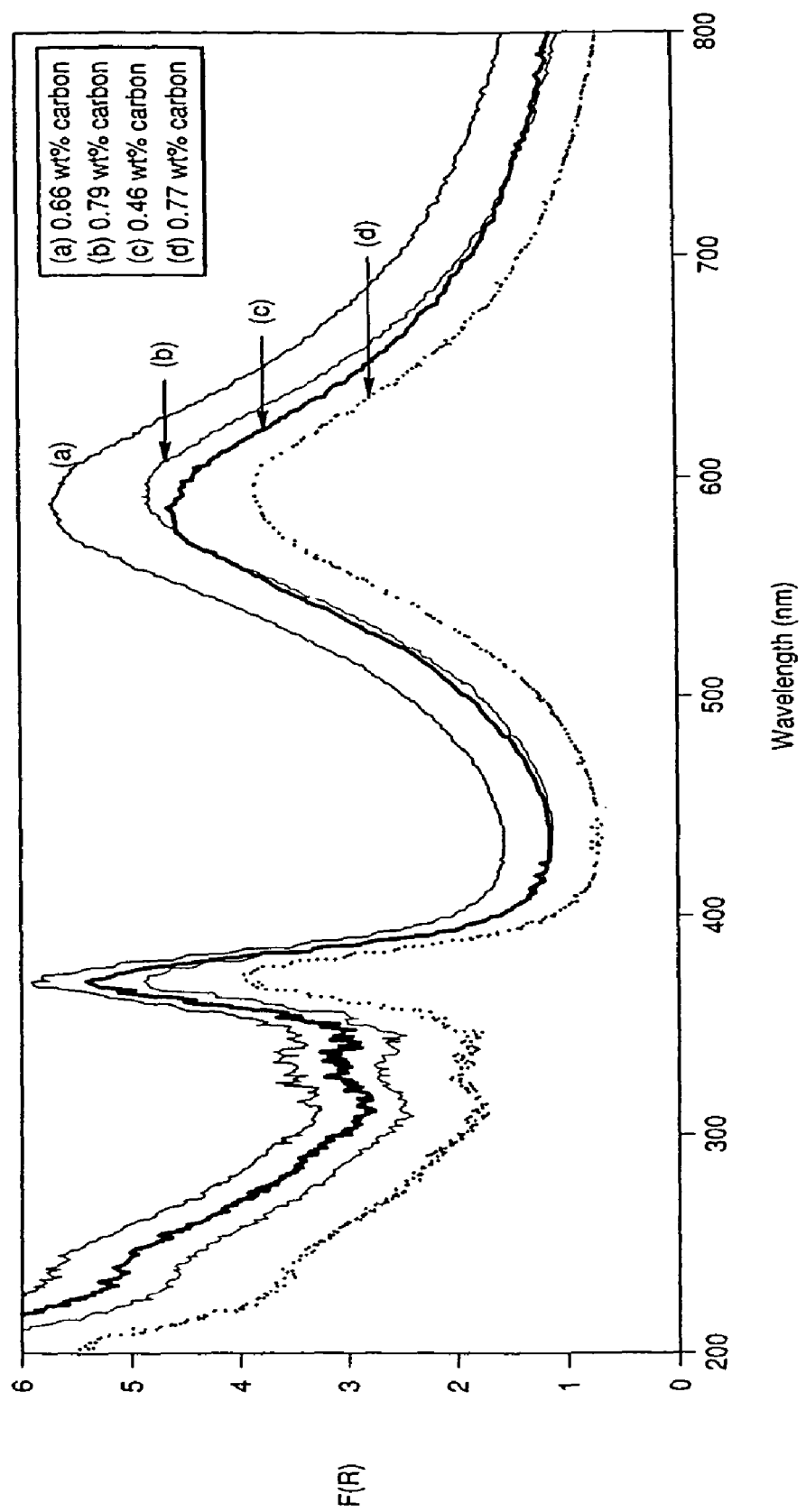
FIG. 12 shows the UV-Vis spectra for a fifth carbon-coated effect pigment.

FIG. 12 demonstrates that high color intensity can be obtained by carefully controlling polymer deposition prior to pyrolysis, and that color intensity is not solely a function of carbon content.

Example 41

Polymer deposition was performed on Lumina Red Blue as in Example 39 except the polymer deposition was continued until five depositions of each of the polymers, PDADMAC and PSS, had been applied in an alternating manner. Aliquots were taken after every cycle (PDADMAC & PSS). After filtration and washing, each sample was dried in air at 90°, and then slurried in 1% w/w aqueous sulfuric acid at a pH of approximately 2. After 15 minutes contact time, the samples were filtered, washed, and dried. Pyrolysis was then performed in flowing nitrogen by heating to 600° C. in two hours, holding at 600° C. for two hours, and cooling to room temperature. The samples were an intense blue color. Elemental analyses revealed carbon contents of 0.12, 0.25, 0.38, 0.47, and 0.62% w/w carbon for 1 through 5 polymer cycles respectively.

Example 42

20 g of commercially available $TiO_2$-coated mica (Lumina Turquoise) was added to a solution comprising 2 g of concentrated $H_3PO_4$ and 198 g deionized water. After stirring for 15 minutes at room temperature, the substrate was collected by filtration, washed and dried at 90° C.

The substrate was then added to 100 ml of 0.1 M NaCl. To this was added 6.44 g of 1% w/w aqueous PSS in 0.1 M NaCl, and the mixture stirred for 5 minutes. Then without any intermediate filtration or washing, 5.05 g of 1% w/w aqueous PDADMAC in 0.1 M NaCl was added and the mixture stirred for 5 minutes Alternate polymer depositions of PSS and PDADMAC were applied with no intermediate filtration or washing at intervals of five minutes until a total of eight treatments with each polymer had been achieved. The substrate composition is then described as TCM+(PSS+PDADMAC)$_8$. The substrate was then filtered, washed with an excess of deionized water, and dried at 90° C.

The substrate was then heated in a box furnace in flowing nitrogen from room temperature to 600° C. in two hours, and the temperature held at 600° C. for two hours in flowing nitrogen. The sample was then cooled to room temperature in flowing nitrogen. The powdered sample was an intense turquoise color. Elemental analysis gave a carbon content of 0.97% carbon w/w.

Example 43

10 g of cationic starch Cellquat® H-100 (National Starch and Chemical) was dissolved in 990 g deionized water. To 200 ml of this solution was added 20 g of commercially available $TiO_2$-coated mica (Lumina Turquoise 9T30D), and the mixture stirred at room temperature for 5 minutes. After 5 minutes, the substrate was recovered by filtration, and washed with an excess of deionized water.

The substrate was then slurried in a solution comprising 2 g of poly(sodium 4-styrene sulfonate) (PSS) dissolved in 200 g of 0.1 M NaCl. The mixture was stirred at room temperature for 5 minutes, and the substrate collected by filtration, and washed with an excess of deionized water.

Alternating H-100 and PSS treatments were then repeated until a total of 5 depositions of each of the H-100 and PSS had been applied. Aliquots were taken after one, three and five H-100/PSS treatments. Samples were then dried at 90° C. in air. After drying, samples were placed in a box furnace, and flowing nitrogen containing 1% $CO_2$ was introduced into the furnace. Samples were heated to 600° C. in two hours, and held at 600° C. for 2 hours. The samples were then furnace cooled to ambient temperature in flowing nitrogen, and removed from the furnace. Samples were a turquoise color after pyrolysis. Elemental analyses were performed on the samples before and after pyrolysis to determine the weight percentages of carbon. Elemental results gave carbon contents of 0.14, 0.17 and 0.42% carbon w/w for one, three and five H-100/PSS treatments respectively.

Example 44

1 g of 4-aminobenzoic acid (para benzoic acid, PABA) was dissolved in 99 g of deionized water by heating to approximately 45° C. until a clear liquid was obtained. To 25 g of this solution was added 5 g of carbon-coated Lumina Red Blue prepared as described in Example 39 using seven cycles of continuous (PDADMAC+PSS) polymer addition, followed by pyrolysis at 600° C. in 1% $CO_2$/99% $N_2$. The carbon content of this substrate prior to reaction with PABA was 0.71% w/w.

After stirring the carbon-coated substrate in the PABA solution for 5 minutes, the substrate was collected by filtration, washed with an excess of deionized water and dried at 90° C. Elemental analysis revealed that the carbon content following reaction with PABA was 1.05% carbon w/w.

Example 45

20 g of commercially available $TiO_2$ coated mica (Lumina Turquoise 9T30D) was slurried in a solution comprising 2.0 g of 20 w/w aqueous PDADMAC in 72 g of 0.1 M aqueous NaCl at pH 7. After stirring at room temperature for 5 minutes, the solid was recovered by filtration, and washed with deionized water. The solid was then added to a solution containing 1.0 g of 40% w/w polyacrylic acid (PAA, average molecular weight 30,000) in 72 g of 0.1 M aqueous NaCl at pH 7. The pH of the slurry was then increased to ~9.4. After stirring for 5 minutes at room temperature, the solid was recovered by filtration, and washed with deionized water. Alternate treatments of the solid with PDADMAC and PAA were repeated in an analogous manner until a total of four alternating treatments with each polymer had been applied. Pyrolysis was performed as detailed in Example 39. The carbon content of the material after pyrolysis was determined by elemental analysis to be 0.18% w/w.

Example 46

A 1% w/w solution of polyethylene imine, (PEI, average molecular weight 750,000) in 0.1 M NaCl was prepared, and the pH adjusted to about 6. To 100 ml of this solution, 10 g of a commercially available $TiO_2$-coated mica (Lumina Red Blue) was added, and the mixture stirred for 5 minutes at room temperature. After 5 minutes, the substrate was recovered by filtration and washed with deionized water that had been adjusted to pH ~6. The substrate was then slurried in 100 ml of a 1% w/w solution of PSS in 0.1 M NaCl and stirred for 5 minutes at room temperature. Following this treatment, the substrate was collected by filtration and washed with deionized water that had been adjusted to pH ~6. The substrate was then subjected to repeat alternating treatments with PEI and PSS to a total of six treatments with each polymer. Aliquots were taken after four, five and six polymer deposition cycles.

After the final filtration and washing, the sample was dried in air at 90° C. overnight. Pyrolysis was performed as detailed in Example 39. The carbon contents after pyrolysis for samples prepared using four, five and six polymer deposition cycles were 0.45%, 0.54% and 0.65% respectively.

Example 47

100 g of commercially available $TiO_2$ coated mica (Lumina Turquoise, 9T30D) was dispersed in 666 g of deionized water. Cerium and aluminum were deposited on the surface of the substrate according to a process described in U.S. Pat. No. 5,759,255. Aqueous cerium and aluminum salts were added in amounts appropriate to achieve a 0.4% w/w Ce loading and a 0.29 w/w % Al loading based on the total weight of solid product. Following cerium/aluminum deposition, the solid was recovered by filtration, washed with deionized water and dried at 120° C.

20 g of this material was then dispersed in 100 ml of 0.1 M NaCl, and the pH adjusted to approximately 9. The slurry was maintained under constant agitation. To this slurry was added 5.05 g of 1% w/w aqueous PDADMAC at pH ~9 (average molecular weight 100,000-200,000) in 0.1 M NaCl, and the mixture stirred for 5 minutes. Then without any intermediate filtration or washing, 6.44 g of 1% w/w aqueous PSS at pH ~9 (average molecular weight 70,000) in 0.1 M NaCl was added and the mixture stirred for 5 minutes. Repeat additions of these polymer amounts were made by alternating PDADMAC and PSS polymers until a total of six additions of each polymer had been completed.

After six alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. The material was an intense turquoise color after pyrolysis. Elemental analysis performed on the sample after pyrolysis indicated a carbon content of 0.81% w/w. The material displayed enhanced UV stability compared with a carbon-coated sample that had no cerium treatment.

Example 48

A material was prepared as described in Example 47 except that the aqueous deposition of 0.4% w/w Ce loading and a 0.29 w/w % Al loading was changed to only 0.34% w/w Ce. The material was an intense turquoise color after pyrolysis. Elemental analysis performed on the sample after pyrolysis indicated a carbon content of 0.86% w/w. XPS on the carbon-coated sample showed a total surface cerium content of 1.25 atom percent, comprised of 0.98% $Ce^{3+}$ and 0.27% $Ce^{4+}$ ($Ce^{4+}/Ce^{3+}$=0.28).

Example 49

25 g of commercially available $TiO_2$ coated mica (Lumina Turquoise, 9T30D) was dispersed in 167 g of deionized water. Cerium was deposited on the surface of the substrate according to a process described in U.S. Pat. No. 5,759,255 in an amount corresponding to a 0.34% w/w Ce loading based on the total weight of solid product.

Following cerium deposition, the heat source was removed, and polymer addition was undertaken with no intermediate filtration or washing. The pH of the slurry was adjusted to ~9, and 6.33 g of 1% w/w aqueous PDADMAC (average molecular weight 100,000-200,000) in 0.1 M NaCl at pH ~9 was added, and the mixture stirred for 5 minutes. Then without any intermediate filtration or washing, 8.05 g of 1% w/w aqueous PSS (average molecular weight 70,000) in 0.1 M NaCl at pH~9 was added and the mixture stirred for 5 minutes. Repeat additions of these polymer amounts were made by alternating PDADMAC and PSS polymers until a total of six additions of each polymer had been completed.

After six alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. The material was an intense turquoise color after pyrolysis. Elemental analysis performed on the sample after pyrolysis indicated a carbon content of 0.75% w/w. XPS on the carbon-coated sample showed a total surface cerium content of 1.6 atom percent, comprised of 0.7% $Ce^{3+}$ and 0.9% $Ce^{4+}$ ($Ce^{4+}/Ce^{3+}$=1.3).

Example 50

A material was prepared as described in Example 49 except that the cerium deposition was performed at ambient temperature. The material after pyrolysis was an intense turquoise color, and contained 0.77% w/w carbon. XPS on the carbon-coated sample showed a total surface cerium content of 1.9 atom percent, comprised of 0.7% $Ce^{3+}$ and 1.2% $Ce^{4+}$ ($Ce^{4+}/Ce^{3+}$=1.7).

Example 51

25 g of commercially available $TiO_2$ coated mica (Lumina Turquoise, 9T30D) was dispersed in 167 g of deionized water, and the pH adjusted to approximately 3 with 1:1 hydrochloric acid. 0.42 g of cerium (IV) sulfate hydrate complex with sulfuric acid, $Ce(SO_4)_2 \cdot H_2O \cdot H_2SO_4$, was added and stirred for approximately 15 minutes at room temperature. The pH was then slowly increased to approximately 6.5 by the addition of 3.5% NaOH solution, and the mixture stirred for 30 minutes.

Polymer addition was then undertaken with no intermediate filtration or washing. The pH of the slurry was adjusted to ~9, and 6.33 g of 1% w/w aqueous PDADMAC (average molecular weight 100,000-200,000) in 0.1 M NaCl at pH ~9 was added, and the mixture stirred for 5 minutes. Then without any intermediate filtration or washing, 8.05 g of 1% w/w aqueous PSS (average molecular weight 70,000) in 0.1 M NaCl at pH~9 was added and the mixture stirred for 5 minutes. Repeat additions of these polymer amounts were made by alternating PDADMAC and PSS polymers until a total of six additions of each polymer had been completed.

After six alternate additions of each polymer solution, the solid product was recovered by filtration, washed with excess deionized water, and dried overnight at 90° C. After drying, the solid was placed in a box furnace, and flowing nitrogen containing 1% $CO_2$ was introduced into the furnace. The solid sample was heated to 600° C. in two hours, and then held at that temperature for 2 hours. The sample was then furnace cooled to ambient temperature in flowing nitrogen, and removed from the furnace. The material after pyrolysis was an intense turquoise color, and contained 0.74% w/w carbon. XPS on the carbon-coated sample showed a total surface cerium content of 0.7 atom percent, comprised of 0.7% $Ce^{3+}$; $Ce^{4+}$ was not detected.

Various changes and modifications can be made in the process and products of the present invention without departing from the spirit and scope thereof. The embodiments described and illustrated herein were for the purpose of further illustrating the invention but were not intended to limit it.

What is claimed is:

1. A pigment comprising a substrate having an organic coating comprised of a carbon-containing ionic species, said coating comprising from 2-10 alternating sequences of a cationic polymer layer and an anionic polymer layer.

2. The pigment of claim 1 wherein said substrate is a platy substrate.

3. The pigment of claim 2 wherein said platy substrate is mica, synthetic mica, bismuth oxychloride, glass, platy iron oxide, platy aluminum oxide, platy silicon dioxide, or metal oxide-coated derivatives thereof.

4. The pigment of claim 2 wherein said platy substrate is titanium dioxide-coated mica.

5. The pigment of claim 2 wherein said platy substrate is iron oxide-coated mica.

6. The pigment of claim 3 further containing cerium dioxide.

7. The pigment of claim 6 containing divalent iron, trivalent iron, or mixtures thereof.

8. The pigment of claim 7 wherein said pigment substrate comprises $Fe_2O_3$ and $TiO_2$ coatings on mica.

9. The pigment of claim 1 wherein said cationic polymer contains nitrogen.

10. The pigment of claim 1 wherein said cationic polymer contains carboxylic acid or carboxylate groups.

11. The pigment of claim 1 wherein said anionic polymer contains sulfur.

12. The pigment of claim 1 wherein at least one of said plurality of alternating sequences is an alternating layer of polyallyldimethyl ammonium chloride an poly(sodium 4-styrene sulfonate).

13. The pigment of claim 1 wherein said substrate comprises 5 alternating sequences of cationic compound layers and anionic compound layers.

14. The pigment of claim 1 wherein said substrate comprises 10 alternating sequences of cationic compound layers and anionic compound layers.

15. The pigment of claim 1 wherein said organic coating is treated to generate a carbon coating on said pigment substrate.

16. The pigment of claim 15 wherein said organic coating is thermally treated to generate said carbon coating.

17. The pigment of claim 15 wherein said organic coating is treated by pyrolysis to generate said carbon coating.

* * * * *